United States Patent [19]

Takemoto et al.

[11] Patent Number: 4,990,935

[45] Date of Patent: Feb. 5, 1991

[54] THERMAL HEAD

[75] Inventors: Shuichi Takemoto, Chiryu; Ryohei Yabuno; Masami Ishii, both of Toyota, all of Japan

[73] Assignee: Aisin Seiki Kabushiki Kaisha, Kariya, Japan

[21] Appl. No.: 258,855

[22] Filed: Oct. 17, 1988

[30] Foreign Application Priority Data

Oct. 16, 1987 [JP] Japan ................................ 62-262322

[51] Int. Cl.[5] ....................... G01D 15/10; H01C 1/012

[52] U.S. Cl. ................................. 346/76 PH; 338/309

[58] Field of Search .................... 396/76 PH; 338/309; 219/216

[56] References Cited

U.S. PATENT DOCUMENTS

| | | | |
|---|---|---|---|
| 3,609,924 | 9/1971 | Cady et al. | 219/216 |
| 4,636,813 | 1/1984 | Meco et al. | 346/76 PH |

*Primary Examiner*—Bruce A. Reynolds
*Assistant Examiner*—Gerold e. Preston
*Attorney, Agent, or Firm*—Banner, Birch, McKie & Beckett

[57] ABSTRACT

A thermal head is provided which includes a substrate of insulating material, a plurality of heat elements aranged on the substrate, a common electrode connected to a first end of each of the heat elements, and a plurality of gold patterns, each of which is connected to a second end of each of the heat elements. A protective layer is disposed on each of the plurality of gold patterns for protecting the gold patterns from damage due to the formation of electrical contacts thereto.

15 Claims, 1 Drawing Sheet

THERMAL HEAD

BACKGROUND OF THE INVENTION

1. Field of the Invention

The present invention generally relates to a thermal head for recording numbers, letters, and the like on a thermal paper and, more particularly, to an improved structure for providing an electrical connection thereto.

2. Description of the Prior Art

Japanese Laid-Open Patent Application No. 60-192659 discloses a conventional thermal head. In such thermal heads, gold is used as a terminal or pattern to which soldered electrical connections are made. However, since the gold pattern itself is subjected to exposure to the solder, it is very difficult to make precise, effective electrical connections to the gold terminal or pattern by soldering.

SUMMARY OF THE INVENTION

Accordingly, it is an object of the present invention to provide a thermal head which overcomes the aforementioned disadvantage.

It is another object of the present invention to provide a thermal head in which each gold pattern is protected from soldering.

To achieve the objects and in accordance with the purposes of the present invention, a thermal head is provided which includes a substrate of insulating material, a plurality of heat elements arranged on the substrate, a common electrode connected to a first end of each of the heat elements, and a plurality of gold patterns, each of which is connected to a second end of each of the heat elements. A protective layer is disposed on each of the plurality of gold patterns for protecting the gold patterns from damage due to the formation of electrical contacts thereto.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings wherein.

DETAILED DESCRIPTION

Figure 1:
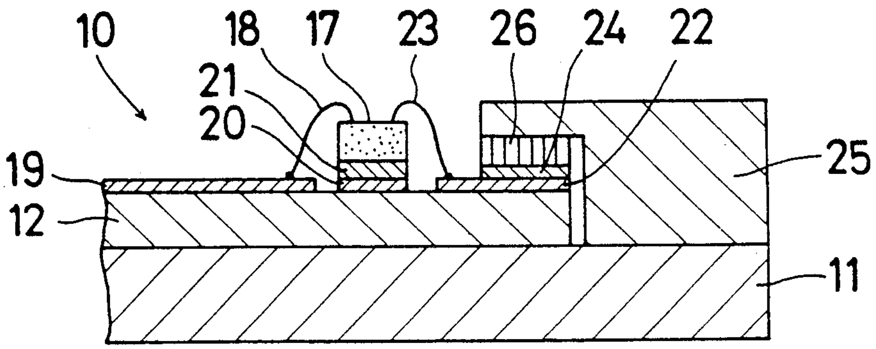
FIG. 1 is a partial cross-sectional view of a thermal head in accordance with the present invention.
Figure 2:
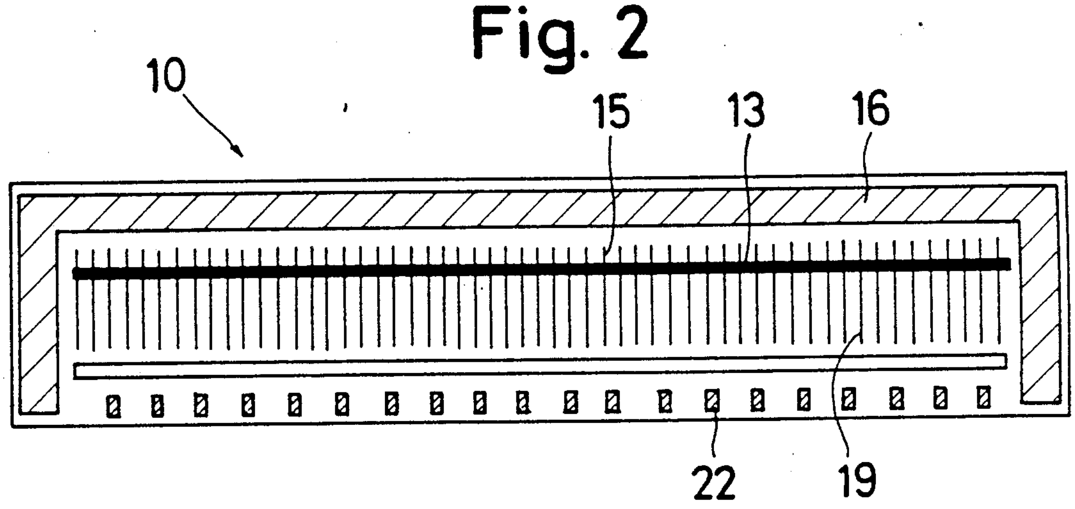
FIG. 2 a plan view of a thermal head which is in the course of process.
Figure 3:
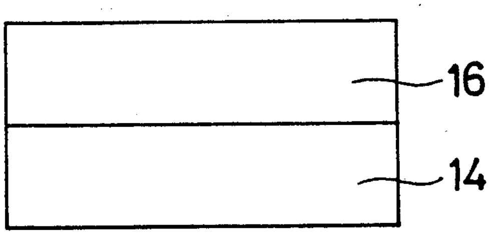
FIG. 3 is a schematic representative showing the relationship of the common electrode and the conductive pattern.

Thermal head 10 includes heat sink 11 on which a substrate 12 of insulating material such as alumina is positioned. A plurality of heat elements 13 are disposed on substrate 12 by a screen printing method. For simplicity, heat elements 13 are illustrated as a single line in FIG. 2. One end of each heat element 13 is coupled to common electrode or pattern 14, shown in FIG. 3, by gold pattern 15. Common electrode 14 typically has a thickness in the range of 0.6–0.8 um. The common electrode 14 is positioned on substrate 12 by a screen printing method, i.e., gold in a liquid form is printed on substrate 12 and is baked. To reduce the overall resistance of thermal head 10, conductive pattern 16 having a thickness of between 3–5 um is formed on common electrode 14 as schematically indicated in FIG. 3. Conductive pattern 16 may be formed from materials such as silver, silver-palladium, silver-platinum, and the like.

A plurality of integrated circuits (ICs) 17 are arranged in parallel with heat elements 13. Each IC 17 is coupled to heat elements 13 through a gold wire 18 and a gold pattern 19. Each IC 17 controls the electric current from gold pattern 19 to a set of heat elements 13 in a manner to generate numbers, letters, and the like. Each IC 17 is fixedly mounted on a gold pattern 20 formed on substrate 12 by means of a silver paste 21 having a thickness of 10 um. Each IC 17 is also coupled to a gold pattern 22 through a gold wire 23. Gold pattern 22 is overlaid with a layer 24. Layer 24 preferably has a thickness of 8 um and is preferably formed from the same material as conductive pattern 16. Layer 24 is printed on the gold pattern 22 simultaneously with the formation of the conductive pattern 16.

To form the electrical connection between gold pattern 22 and a Flexible Print Circuit (FPC) 25, solder 26 is formed between layer 24 and FPC 25. However, since the gold pattern 22 is protected by layer 24, gold pattern 22 is not subjected to the solder or the soldering process and a precise, effective electrical connection may be formed. It should be noted that the material from which paste 21 is formed may be utilized to form layer 24.

While the invention has been particularly shown and described with reference to preferred embodiments thereof, it will be understood by those skilled in the art that other changes in form and details can be made without departing from the spirit and the scope of the invention.

We claim:

1. A thermal head comprising:

a substrate of insulating material;

a plurality of heat elements arranged on said substrate;

a common electrode coupled to a first end of each of said plurality of heat elements;

a plurality of gold patterns, each gold pattern coupled to a second end of each of said plurality of heat elements; and electrically conductive protection means selectively disposed on each of said plurality of gold patterns for protecting said gold patterns from damage due to the formation of electrical contacts thereto.

2. A thermal head according to claim 1 wherein said protection means and said common electrode are formed from the same material.

3. A thermal head according to claim 2 wherein said protection means is formed on said gold pattern simultaneously with the printing of a conductive pattern on said common electrode.

4. A thermal head according to claim 1 wherein said electrically conductive protection means comprises an electrically conductive layer disposed over at least a portion of each of said gold patterns.

5. A thermal head according to claim 4 wherein said electrically conductive layer comprises silver.

6. A thermal head according to claim 4 wherein said electrically conductive layer comprises silver platinum.

7. A thermal head according to claim 4 wherein said electrically conductive layer comprises silver palladium.

8. A thermal head comprising:

a substrate of insulating material;

a plurality of heat elements arranged on said substrate;

a common electrode coupled to a first end of each of said plurality of heat elements;

a plurality of integrated circuits, each of said plurality of integrated circuits coupled to a second end of at least one of said plurality of heat elements;

a plurality of gold patterns, a gold pattern coupled to each of said plurality of integrated circuits; and electrically conductive protection means selectively disposed on each of said plurality of gold patterns for protecting said gold patterns from damage due to the formation of electrical contacts thereto.

9. A thermal head according to claim 8 wherein said protection means is formed of the same material as a paste for connecting said integrated circuit to said substrate.

10. A thermal head according to claim 8 wherein said protection means and said common electrode are formed from the same material.

11. A thermal head according to claim 10 wherein said protection means is formed on said gold pattern simultaneously with the printing of a conductive pattern on said common electrode.

12. A thermal head according to claim 8 wherein said electrically conductive protection means comprises an electrically conductive layer disposed over at least a portion of each of said gold patterns.

13. A thermal head according to claim 12 wherein said electrically conductive layer comprises silver.

14. A thermal head according to claim 12 wherein said electrically conductive layer comprises silver platinum.

15. A thermal head according to claim 12 wherein said electrically conductive layer comprises silver palladium.

* * * * *